United States Patent

[11] 3,632,472

[72] Inventor Donald Stanley Pettinger
 Knutsford, England
[21] Appl. No. 712,482
[22] Filed Mar. 12, 1968
[45] Patented Jan. 4, 1972
[73] Assignee The Nuclear Power Group Limited
 Knutsford, England
[32] Priority Mar. 17, 1969
[33] Great Britain
[31] 12,537/67

[54] SOLID NEUTRON-MODERATING CORE
 STRUCTURES FOR NUCLEAR REACTORS
 6 Claims, 16 Drawing Figs.
[52] U.S. Cl.................................................. 176/84
[51] Int. Cl................................................... G21c 5/16
[50] Field of Search...................................... 176/84, 92

[56] References Cited
 UNITED STATES PATENTS
3,085,958  4/1963  Knights et al................. 176/84
3,342,693  9/1967  Triggs.......................... 176/84
 FOREIGN PATENTS
 623,845  2/1963  Belgium....................... 176/84
1,054,288  1/1967  Great Britain................ 176/84

Primary Examiner—Reuben Epstein
Attorney—Holman & Stern

ABSTRACT: A core structure for a nuclear reactor, comprising an assembly of blocks of neutron-moderating material arranged in vertical columns, wherein the opposed faces of adjacent blocks in at least some of the columns are so shaped that one opposed face can roll over the other and such that when the blocks are assembled in the column, the lines or areas of contact are displaced from a vertical plane or planes through the centers of gravity of the blocks of the column whereby overturning moments are exerted on the blocks causing them to lean in mutually supporting relationship on blocks in adjacent columns.

PATENTED JAN 4 1972

INVENTOR
DONALD STANLEY
PETTINGER
BY
ATTORNEYS

INVENTOR
BY DONALD STANLEY
PETTINGER
ATTORNEYS

SOLID NEUTRON-MODERATING CORE STRUCTURES FOR NUCLEAR REACTORS

This invention relates to solid neutron-moderating core structures for nuclear reactors.

It is common practice to construct solid neutron-moderating core structures of blocks of neutron-moderating material, such as graphite, the blocks being assembled in columns within a constraining framework.

In a typical arrangement, the blocks are arranged in vertical columns and channels for nuclear fuel are formed either in bores in the blocks extending through the columns or in spaces defined by the sides of blocks in adjacent columns.

Dimensional changes in graphite as a result of temperature and irradiation in the reactor core can produce differential shrinkage and growth resulting in an unstable core structure, and the object of the present invention is to provide a core structure which can accommodate these dimensional changes and which is inherently self-stabilizing.

The invention consists in a solid neutron-moderating core structure for a nuclear reactor, comprising an assembly of blocks of neutron-moderating material arranged in vertical columns, wherein the opposed faces of adjacent blocks in at least some of the columns are so shaped that one opposed face can roll over the other and such that when the blocks are assembled in the column, the lines or areas of contact are displaced from a vertical plane or planes through the centers of gravity of the blocks of the column whereby overturning moments are exerted on the blocks causing them to lean in mutually supporting relationship on blocks in adjacent columns, lateral constraining means being positioned to surround the core structure to counteract lateral outward forces around the periphery of the core.

The blocks may be of any cross-sectional shape which permits interfitting of blocks of adjacent columns so as to keep the size of voids between adjacent columns within acceptable limits. In a typical core, the opposed faces of adjacent blocks in a column are curved to permit a rolling action between adjacent blocks of the column. The radius and center of curvature of the curved end faces are chosen so that the lines or areas of contact between adjacent blocks of a column are displaced from a vertical plane through the centers of gravity of the blocks of the column. The curves on opposed end faces of a block may be convex, or one may be convex ad the other flat or one may be convex and the other concave but of different radius.

The shaped end faces of adjacent blocks may, in addition to being curved, be shaped so that when viewed in a direction tangential to the curve the surface is convex or concave so that adjacent blocks of a column nest more securely together.

The blocks of a given column may lean on blocks of an adjacent column or columns of similarly shaped blocks or they may lean on blocks of an interstitial column of blocks. Such an interstitial column may have blocks the contacting surfaces of which are flat.

The cross sections of the blocks may be such that blocks of adjacent columns define channels for nuclear fuel or control rods or blocks of selected columns may have bores therein forming channels for nuclear fuel or control rods.

In one embodiment of the invention the columns of blocks are arranged in sets of four with an interstitial column located within the set, the blocks of the four columns being adapted to lean against blocks of the interstitial column in mutually supporting relationship, and channels for nuclear fuel being formed between the adjacent sets of columns with the centerlines of the channels lying at the intersections of a square lattice.

In another embodiment of the invention the columns of blocks are arranged in sets of three with the blocks of each column of a set leaning against blocks of other columns of the set in mutually supporting relationship channels for nuclear fuel being formed between the adjacent sets of columns with the centerlines of said channels lying at the intersection of a triangular lattice.

The invention is particularly, though not exclusively, intended for solid neutron moderator core structure using graphite blocks.

Various embodiments of the invention will now be described by way of example with reference to the accompanying drawings in which.

Figure 1:
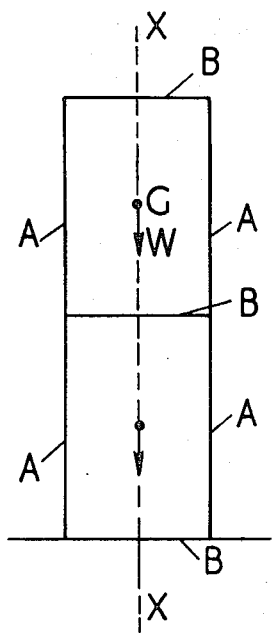
FIG. 1 is a section through two adjacent blocks of a column of a conventional moderator core structure showing the forces acting.

In order to explain the operation of the present invention, reference will be made, first of all, to FIG. 1, which shows a typical block shape for a conventional reactor moderator core structure. Each block is typically of elongated form with a regular cross section, for example square or hexagonal and has parallel side faces A. The end faces B are plane and lie at right angles to the vertical axis XX through the respective centers of gravity of the blocks.

The gravitational force W acting through the center of gravity of each block has a line of action which intersects the area of contact and the blocks are in a position of stable equilibrium as far as gravitational forces are concerned. Under the effects of high operating temperatures and irradiation in the reactor, graphite blocks suffer dimensional changes including shrinkage. While uniform shrinkage of itself would not disturb the equilibrium of the blocks under gravitational forces, differential shrinkage occurs which causes the blocks to become bowed and to lean in random fashion against blocks in adjacent columns so generating lateral forces capable of causing the blocks to become displaced to such an extent that bores, in adjacent blocks of a column, housing nuclear fuel can become misaligned.

In order to maintain a fixed lattice position for the fuel channels under all conditions of reactor operation, the graphite blocks of adjacent columns are commonly keyed together as also are the adjacent blocks of a column. The keys prevent or reduce to acceptable limits the lateral displacement of the blocks.

Figure 2:
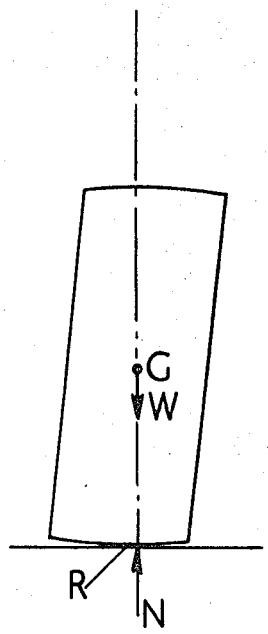
FIG. 2 shows a freestanding block constructed in accordance with the invention.
Figure 3:
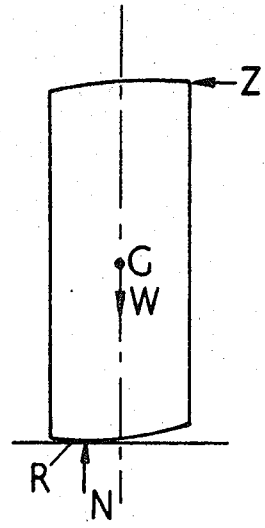
FIG. 3 shows the block of FIG. 2 displaced from its freestanding position and showing the forces acting.
Figure 4:
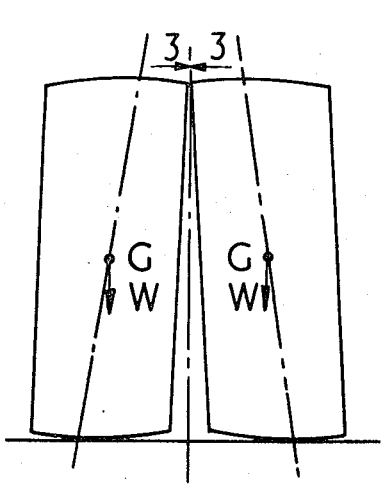
FIG. 4 shows two blocks of the form shown in FIGS. 2 and 3 leaning against one another and showing the forces acting.

FIGS. 2, 3 and 4 show the basic principles of self stabilization in accordance with the invention.

FIG. 2 shows a single block which, due to the offset curvature on the end faces has a lean, the direction of which is predetermined when freestanding.

FIG. 3 shows the same block held in a vertical position but which requires a lateral force Z to maintain the position due to the offset of the center of gravity G from the line of contact R.

From FIGS. 2 and 3 it can be seen that as no horizontal force is required to maintain the position of the block in the position shown in FIG. 2 and force Z is required in the position shown in FIG. 3, the force required for position of the block between these two positions will increase proportionally between zero and Z units of force i.e. force Z increases inversely with the angle of lean.

FIG. 4 shows two blocks leaning against one another in mutually supporting relationship the lateral forces (z) due to the lean of each block being equal. Any transient external force which causes an increased angle of lean in one block causes a decreased angle of lean in the adjacent block but, as the lateral force (z) increases inversely with the angle of lean, a differential restoring force is produced which causes the blocks to return to their original attitude when the transient external force is removed.

Figure 5:
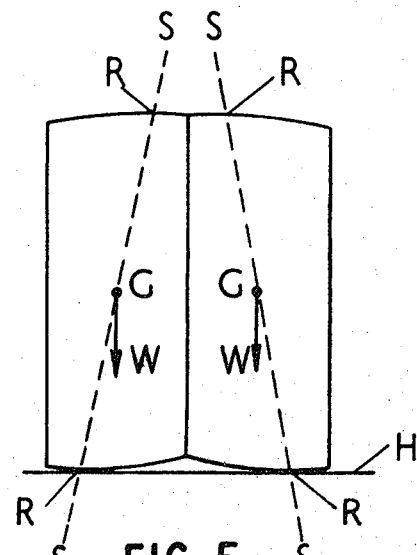
FIG. 5 shows two blocks constructed in accordance with the invention and arranged in mutually supporting relationship.

Referring to FIG. 5, two blocks of adjacent columns are shown in mutually supporting relationship so that their sides are vertical.

Assuming for the purpose of explanation that the two blocks rest on a horizontal surface, it will be seen that the lines or areas of contact R between the blocks and the horizontal surface H are displaced from the lines of action of the gravitational forces W acting through the centers of gravity G. An overturning moment is thus exerted by the gravitational force on each block. By arranging the blocks in mutually supporting relationship as shown each block leans on the other and the two blocks are in stable equilibrium in one plane.

Any transient lateral forces which exert couples tending to overturn the blocks are counteracted by the restoring couples exerted by the gravitational forces provided that the overturning couples are not sufficient to displace the lines of action of the gravitational force W to the other side of the line SS joining the lines of contact R on each end of one block. In practice, the shrinkage occurring in blocks in a reactor is not sufficient to permit or cause a displacement of such magnitude between blocks of adjacent columns.

The principles underlying the invention have so far been discussed in connection with a single layer of blocks. When more than one layer is considered the restoring forces in the lower layers are greatly increased by the weight of the blocks in the upper layers. This additional weight is applied to the top contact line R offset from the vertical line through the center of gravity of the block which in turn produces a reaction at the bottom contact line R offset to the opposite side of the vertical line passing through the center of gravity of the block. The moment arm is therefore double the length of the moment arm applying in a single layer of blocks.

Figure 6:
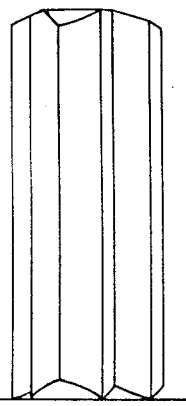
FIG. 6 shows three blocks constructed in accordance with the invention and arranged in mutually supporting relationship.
Figure 7:
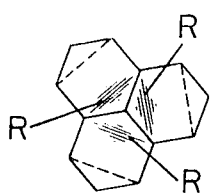
FIG. 7 is a plan view of the blocks of FIG. 6.

FIGS. 6 and 7 show an arrangement in which blocks of hexagonal cross section are disposed so that three adjacent blocks lean against one another in mutually supporting relationship.

Figure 8:
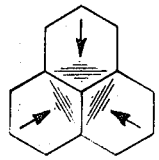
FIG. 8 is a plan view of the blocks of FIG. 6 showing the forces acting.
Figure 9:
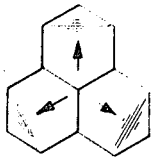
FIG. 9 is a view of the lower ends of the blocks of FIG. 6 showing the forces acting.

FIGS. 8 and 9 show respectively the directions of forces acting at the top of the three blocks and at the bottom thereof. The forces acting at the bottom of the blocks tend to separate the blocks. Such forces would be resisted by similar outward forces exerted by blocks in adjacent columns and by lateral forces at the outside of the core applied by a constraining assembly either in the form of keyed blocks forming a reflector for the core or a thermal shield, by the wall of a vessel housing the core or by a framework surrounding the core or by a combination of one or more of these features.

Figure 10:
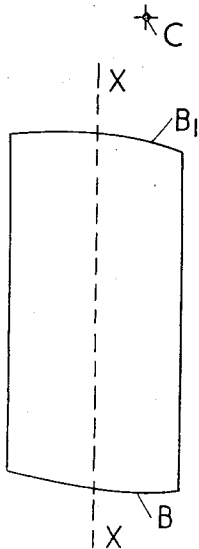
FIGS. 10 and 11 show alternative forms of block construction in accordance with the invention.

FIG. 10 shows a block having each end face curved with the center of curvature lying outside the block and being offset from a vertical line XX through the center of gravity. The center of curvature is at $C_1$ for end face $B_1$, and at C for end face B. The degree of offset from the line XX in each case will be chosen to suit circumstances. The greater the offset the greater will be the restoring couple tending to maintain the blocks in stable equilibrium. The magnitude of the radius is also chosen to suit circumstances, the greater the radius the less rolling movement permitted between adjacent blocks.

Figure 11:
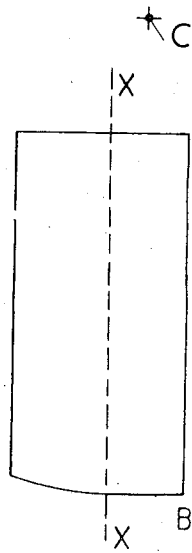

The invention is not dependent for its operation on blocks having both end faces curved. If desired one end face can be a plane face as shown in FIG. 11, but the blocks when assembled in a column would be assembled so that a curved face on one block was in contact with a flat face of an adjacent block.

In an alternative embodiment, not shown, each block may have a convex surface at one end and a concave surface at the other. In such a case the radii of convex and concave surfaces would be different so that a convex surface of one block can contact a concave surface of an adjacent block in a column in such a way as to permit rolling.

Figure 12:
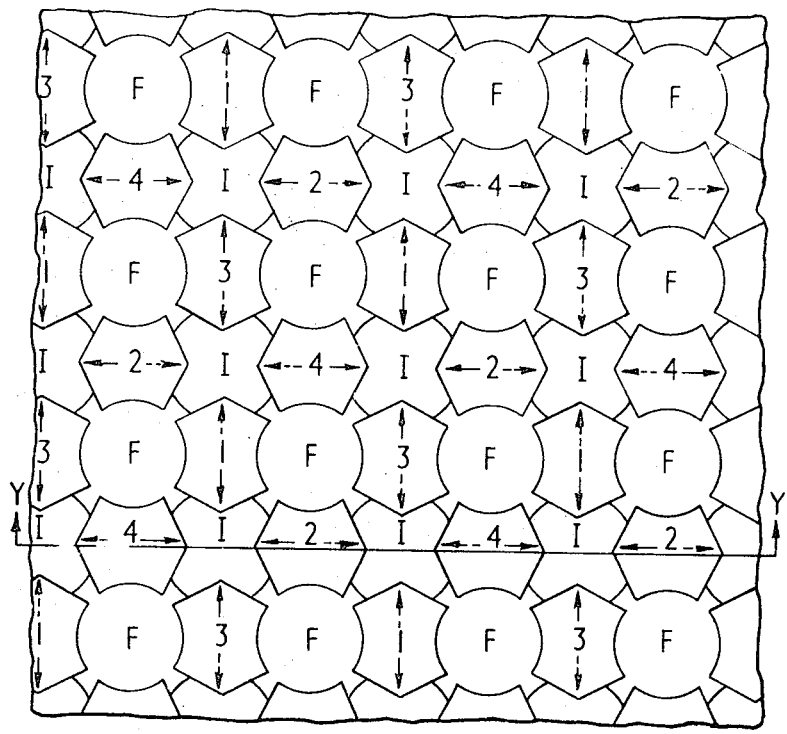
FIG. 12 is a plan view of part of reactor core constructed in accordance with one embodiment of the invention.

FIG. 12 shows in a plan view part of a graphite moderator core structure for a nuclear reactor using blocks constructed and assembled in accordance with one embodiment of the invention.

The cross section of the blocks used is generally hexagonal with the two opposed sides of each block being made concave so that when assembled in columns the blocks of adjacent columns define fuel channels F. These channels may contain blocks with bores therein for housing the nuclear fuel or the fuel may be inserted directly into the channels F.

Figure 13:
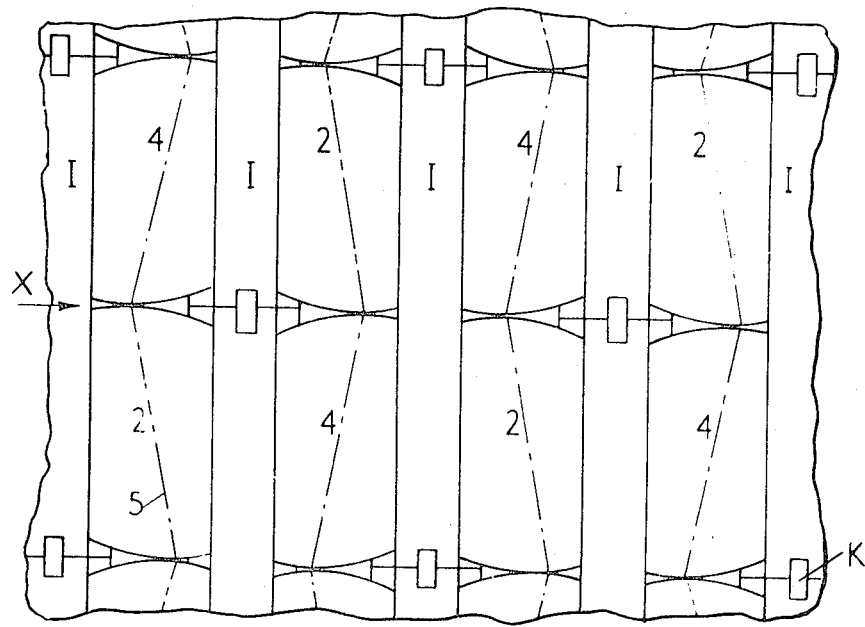
FIG. 13 is a section on line Y—Y of FIG. 12 showing adjacent layers of blocks in the core.

The junctions between blocks in the respective columns lie at the same levels throughout the core so that the core is built up of a number of separate layers of blocks. FIG. 13 shows the layers of blocks and the assembly of blocks in two adjacent columns, being a section on line Y—Y of FIG. 12.

As can be seen from FIG. 12, the blocks in a layer are arranged in sets of four with the blocks 1–4 (in clockwise order) of each set leaning at their upper ends on an interstitial block I. The blocks I are recessed to receive the blocks 1 to 4 of each set and act as spacer blocks and as keying blocks although because of their shape they can be removed readily from the core and do not impede removal of the blocks of each set. In some instance it may be preferable to remove blocks in sets including the interstitial members I located within a set.

The full arrows indicate the direction of the forces at the upper ends of the blocks and the dotted arrows show the direction of the forces acting on said lower end faces.

As can be seen in FIG. 13 the end faces of the blocks are shaped in the manner shown in FIG. 10, the chain dotted lines 5 representing loadlines along which load is transmitted from block to block between pairs of contacting surfaces. The blocks I in each column of interstitial blocks are keyed together by means of keys K. The junctions between the interstitial blocks I may be staggered as shown.

Figure 14:
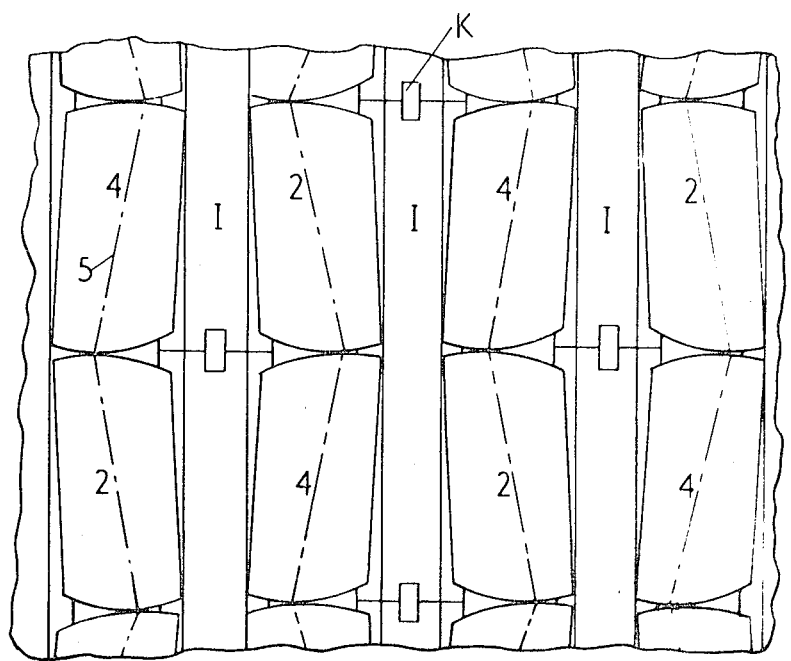
FIG. 14 is a section similar to that of FIG. 13 but showing the position of the blocks after shrinkage has taken place.

FIG. 14 shows the position of the blocks in the columns after shrinkage has taken place.

Figure 15:
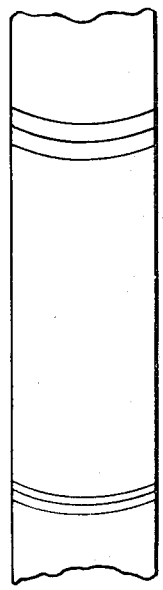
FIG. 15 is a side view of a column of blocks shown in FIG. 13 looking in the direction of the arrow X.

From the side view of the blocks shown in FIG. 15, it will be seen that when viewed in a direction tangential to the curved end faces the end faces are also convex or concave so that adjacent blocks of a column nest more securely together.

Figure 16:
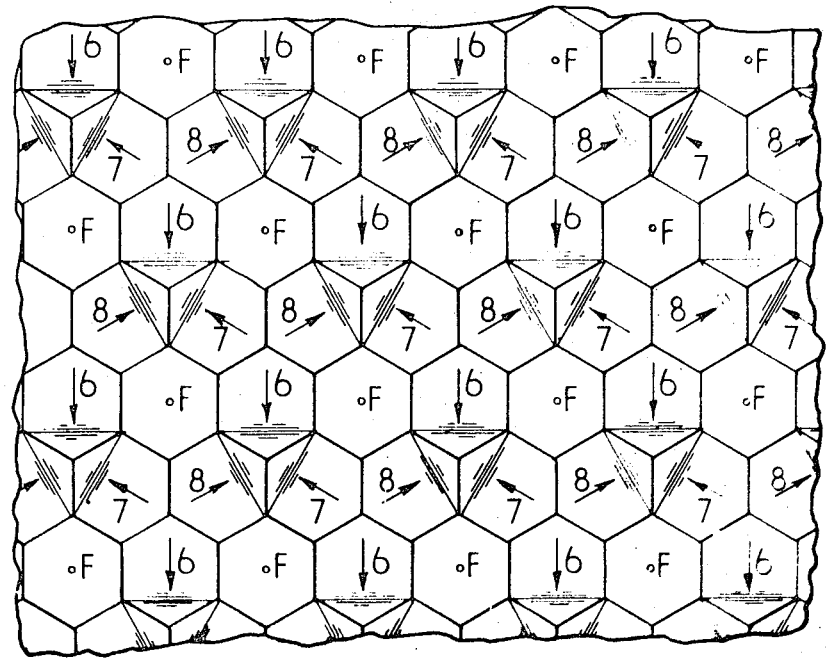
FIG. 16 is a plan view of part of a reactor core constructed in accordance with another embodiment of the invention.

FIG. 16 shows in plan view part of a graphite moderator core structure in accordance with another embodiment of the invention. The core comprises an assembly of vertical columns of blocks of hexagonal cross section with the junctions between blocks of the columns being at the same level throughout the core to form a plurality of layers of blocks.

The blocks in each layer are arranged in sets of three, blocks 6–8 leaning on one another in mutual supporting relationship. Such a pattern of sets of three would extend across the core to a reflector section at the periphery of the core or to core-containing means such as a thermal shield or the wall of a reactor-containing vessel or to a core restraint structure. Due to the use of blocks arranged in sets of three, there occurs over the core structure hexagonal spaces between the sets of blocks which spaces lie with their centerlines on a triangular lattice. These spaces may be used as fuel channels F by inserting hexagonal fuel-carrying blocks which are similar to those used in the remainder of the core, but which have flat or oncenter spherical radius ends.

The forces acting on the tops of the blocks in the layer are shown by the arrows.

While in FIGS. 12 and 16 the spaces F have been described as fuel channels they can be used for other purposes. For example some of the channels F may contain nuclear fuel while others contain control rods or safety rods or reactor instrumentation.

While blocks arranged in sets of three and in sets of four have been described other combinations are possible.

While nuclear fuel can be disposed in containers located in spaces formed between the columns or within channels formed in the blocks, it can also be dispersed within the blocks themselves particularly for high-temperature reactor applications in which event the need for providing interstitial fuel channels between the columns or fuel channels within the blocks themselves is obviated.

I claim:

1. A solid neutron-moderating core structure for a nuclear reactor, which includes a plurality of vertical columns each of which consists of a plurality of prismatic blocks arranged one on top of the other with the opposed end faces of adjacent blocks engaging each other, wherein the opposed end faces of adjacent blocks in at least some of the columns have configurations which define a line of contact between each pair of opposed faces of adjacent blocks, whereby one opposed face can roll over the other, and wherein each said line of contact is offset from a vertical plane containing the center of gravity of the block next above the line of contact to cause an overturning movement to be expected upon each block, the lines of contact being so disposed in the various columns that the blocks lean in mutually supporting relationship in predetermined manner on blocks in adjacent columns, and lateral constraining means being positioned to surround the core structure to counteract lateral outward forces around the periphery of the core.

2. A core structure as claimed in claim 1, comprising columns of blocks arranged in groups with the blocks of each column of a group leaning on blocks of interstitial columns of blocks disposed within the groups and between the groups of columns.

3. A core structure as claimed in claim 2, in which the columns are arranged in groups of four around a central interstitial column the blocks of each group of the four columns being adapted to lean against blocks of an interstitial column in mutually supporting relationship.

4. A core structure as claimed in Claim 1, in which the columns are arranged in groups of three in mutually supporting relationship.

5. A core structure as claimed in claim 1, in which the blocks of the columns are so shaped as to provide spaces in the core for fuel elements.

6. A core structure as claimed in claim 1, in which the blocks of the columns contain nuclear fuel.

* * * * *

UNITED STATES PATENT OFFICE
CERTIFICATE OF CORRECTION

Patent No. 3,632,472                    Dated  January 4, 1972

Inventor(s)  Donald Stanley Pettinger

It is certified that error appears in the above-identified patent and that said Letters Patent are hereby corrected as shown below:

In the heading, Item [32], should read
--Priority Mar. 17, 1967--

Signed and sealed this 15th day of August 1972.

(SEAL)
Attest:

EDWARD M. FLETCHER, JR
Attesting Officer

ROBERT GOTTSCHALK
Commissioner of Patents